Patented May 22, 1934

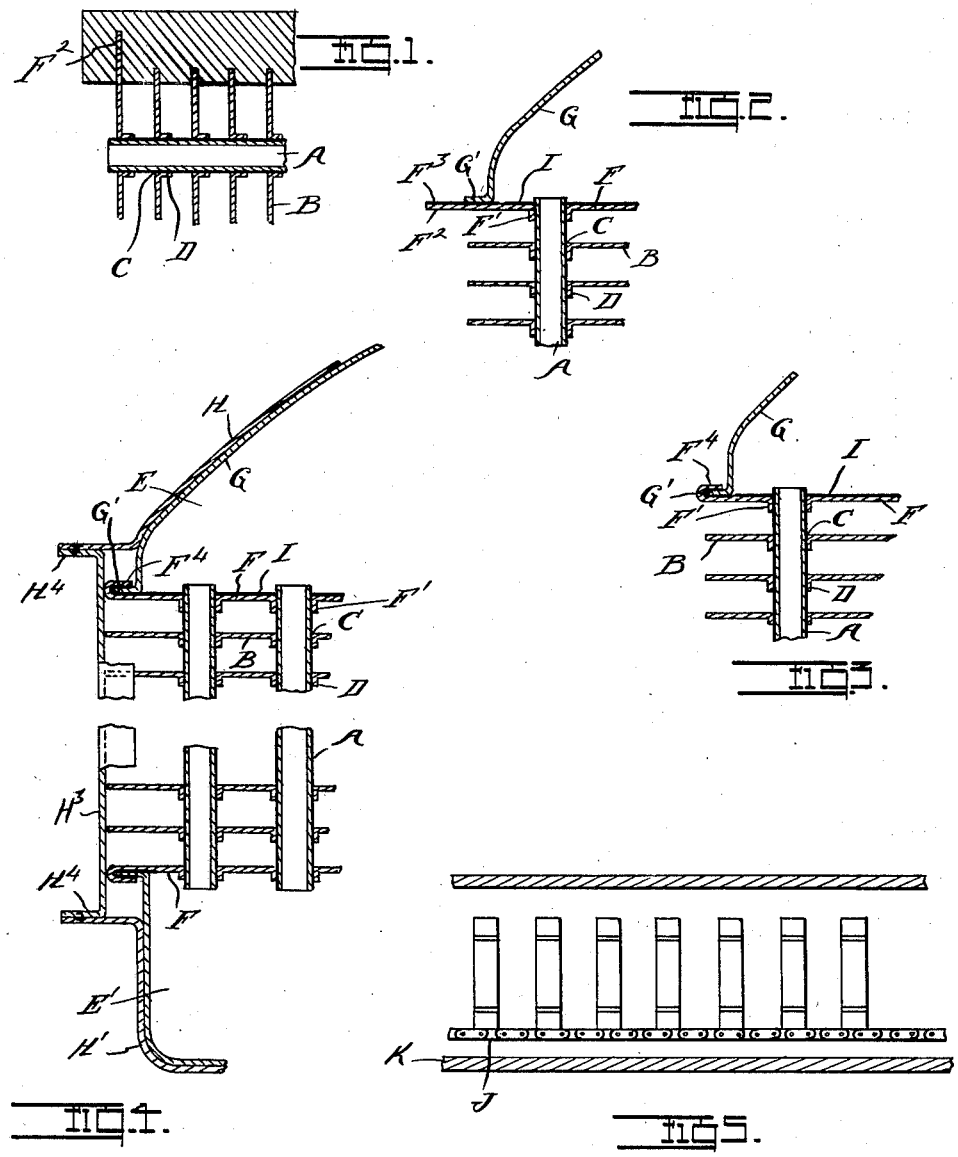

1,959,464

UNITED STATES PATENT OFFICE 1,959,464

METHOD OF MANUFACTURING RADIATORS

John R. Dryden, Detroit, Mich., assignor to Long Manufacturing Company, Detroit, Mich., a corporation of Michigan Application May 1, 1933, Serial No. 668,885

4 Claims. (Cl. 113—118)

The invention relates to the manufacture of radiators and more particularly to radiator cores including top and bottom water tanks, connecting tubes and radiator fins mounted on said tubes. It is the object of the invention, first, to simplify the process; second, to reduce the amount of hand labor; third, to economize in material; fourth, to expedite the manufacture and fifth, to obtain various advantages as hereinafter set forth.

In the drawing:

Fig. 1 is a horizontal section illustrating the manner of simultaneously engaging the tubes with the fins and a header plate;

Fig. 2 is a vertical section showing the manner of engaging the perforated header with a complementary wall thereof;

Fig. 3 is a similar view after the seaming of these members to each other;

Fig. 4 is a similar view showing the manner of attaching the reinforcing frame;

Fig. 5 is a diagram showing the manner of passing the assembled cores through the heating furnace.

As above described, radiator cores of the type to which my improvements apply consist essentially of top and bottom tanks or headers, vertically extending tubes connecting the same and horizontally extending fins sleeved upon said tubes. The headers are also connected to each other at opposite sides by straps or brace members which relieve the tubes from stress. In assembling these parts it has heretofore been the practice to first mount the fins upon the tubes, the outer surface of which have been tinned or coated with solder, and to then heat this assembly to a temperature at which the solder will melt. The headers or tanks are subsequently attached and by successive operations comprising, first, the engagement of the perforated wall of the header with the ends of the tubes; second, soldering the tubes to the perforated wall by localized heat which does not extend to the joints between the fins and tubes. To permit of thus engaging each perforated plate with the tubes it is necessary that the apertures in the plate should be provided with some clearance and in the subsequent soldering operation this clearance space must be filled with solder. This requires the use of more solder than would be necessary with a closer fit between the tubes and the plates. After each plate has been soldered to the tubes, the complementary walls of the tank are seamed to the plate and the seam is rendered water tight by hand soldering.

With my improved process all of the parts comprising the complete core are first assembled with each other and are mechanically secured to hold the same from displacement, after which all of these parts are simultaneously soldered by the heating of the assembly to the proper temperature. Thus I dispense with several separate assembly operations and separate soldering operations, some of which must be performed by hand, thereby greatly simplifying the process. Also by placing the fins and the perforated header plates in a jig which aligns the corresponding tube apertures therein, these apertures may be made to more closely fit the tubes which lessens the amount of solder required for attachment.

The tubes A are preferably of the usual oblong cross section and of a length sufficient to extend from the top to the bottom headers. These tubes are formed up from sheet metal and are externally coated with a film of solder. The fins B are stamped from sheet metal and provided with a series of apertures C corresponding to the cross section of the tube and surrounded by downturned flanges D. Each of the tanks or headers E and E' is formed of a perforated wall F for engaging the ends of the tubes and which is provided with depending flanges F' surrounding each aperture. The wall F is connected to the complementary portion G of the tank by providing the latter with outwardly extending flanges G' around which marginal portions F² of the wall F are return bent to form a seam.

The method of assembling these parts is to first place the fins B and perforated walls F of the headers in a suitable jig which holds the same in parallel relation and with all of the corresponding tube apertures in exact alignment with each other. The tubes D are then threaded through the aligned apertures, after which the marginal portions F² of the walls F are return bent or seamed about the flanges G'. The headers E and E' are then connected to each other by straps or brace members arranged on opposite sides thereof. These brace members are formed in sections including members H and H' respectively attached to the upper and lower headers and a member H³ extending between the members H and H' and having outwardly extending flanges H⁴ which are connected to said members H and H' by spot welding. These brace members will thus hold the parts of the assembly in fixed relation and will relieve the tubes from stress.

Before assembling the parts as just described, the marginal portions F² of the plates F are coated with a film of solder as indicated at F³ so that after forming the return bends as indicated at F⁴ this solder film will be in contact with both sides of the flanges G'. I also preferably lay a thin sheet of solder I approximately fifteen thousandths of an inch in thickness, adjacent to the upper face of the wall F for the upper tank E, this sheet being correspondingly perforated to engage the tubes A.

The assembly formed as above described will not have water tight joints as neither the return bent seams F⁴ nor the flanges F' surrounding the ends of the tubes have been sealed. If, however, this assembly when removed from the jig is placed in an oven and raised to a temperature of approximately 550° F., the solder film F³ and also the solder film on the outer face of the tubes A will melt. The contacting surfaces having all been pretinned, the melted solder will flow around so as to complete the seal. However, to insure that all of the joints around the tubes in the upper header are properly soldered, the solder sheet I when melted will furnish a sufficient amount of liquid solder to accomplish the purpose. It is unnecessary to provide additional solder for the sheet F of the lower header as the melted solder on the tubes A will flow downward and complete the seal.

In carrying out this process I preferably place each assembled core when removed from the jig upon a carrier J which will convey the cores through an oven K, a portion of which is heated to the desired temperature approximately 550° F. The speed of movement is such as to hold the cores in the heated zone from eleven to fourteen minutes, which is sufficient time to bring them up to temperature and insure the soldering of all joints. Thus the only hand labor required is that of assembling the elements in the jig forming the seams F⁴ and attaching the brace members H. The rest of the operation may be entirely automatic and when the cores are delivered from the oven they will be in condition for use.

What I claim as my invention is:

1. The method of forming radiators of the type comprising finned tubes with water tanks or headers at opposite ends thereof which consists in precoating with a film of solder the outer surface of the tubes and the surfaces for forming the seam or joint in the tanks or headers, assembling the tubes with the perforated fins and perforated inner walls of the tanks or headers, seaming said inner walls with the complementary portions of the tanks or headers, mechanically connecting the said parts to hold the same in assembled relation and in subsequently heating the assembly to a temperature at which solder will fuse.

2. The method of forming radiators of the type comprising finned tubes and water tanks or headers at opposite ends of said tubes which consists in precoating with a film of solder the outer surface of the tubes and the surfaces for forming the seam or joint in the tanks or headers, assembling the tubes with the perforated fins and perforated inner walls of the tanks or headers, seaming said inner walls with the complementary portions of said tanks or headers, connecting the tanks or headers with brace members at opposite sides thereof which hold the parts in fixed relation and in heating the assembly to a temperature at which the solder melts to simultaneously effect the soldering of all joints.

3. The method of forming radiators of the type comprising finned tubes and water tanks or headers at opposite ends of said tubes which consists in precoating with a film of solder the outer surface of the tubes and the surface for forming the seam or joint in the tanks or headers, assembling the tubes with the perforated fins and perforated inner walls of the tanks or headers, seaming said inner walls with complementary portions of said tanks or headers, connecting the tanks or headers with brace members at opposite sides thereof which hold the parts in fixed relation and in progressively feeding such assembly through an oven in which it is heated to a temperature at which the solder melts to simultaneously effect the soldering of all joints.

4. The method of forming radiators of the type comprising finned tubes and water tanks or headers at opposite ends thereof which consists in precoating with a film of solder the outer surface of the tubes and the surface for forming the seam or joint in the tanks or headers, assembling the tubes with the perforated fins and perforated inner walls of the tanks or headers, placing a thin sheet of solder on the inner wall of the upper tank, seaming said inner walls with complementary portions of the tanks or headers, mechanically connecting the said parts to hold the same in assembled relation and in subsequently heating the assembly at a temperature at which the solder will fuse to simultaneously effect the soldering of all joints and whereby the sheet of solder on the inner wall of the upper header will effectively seal all the joints between the same and said tubes.

JOHN R. DRYDEN.